United States Patent

Matsuo et al.

[11] Patent Number: 5,813,249
[45] Date of Patent: Sep. 29, 1998

[54] REFRIGERATION CYCLE

[75] Inventors: Hiroki Matsuo, Kariya; Kaoru Tsuzuki, Ichinomiya, both of Japan

[73] Assignee: Denso Corporation, Kariya, Japan

[21] Appl. No.: 909,378

[22] Filed: Aug. 11, 1997

Related U.S. Application Data

[63] Continuation of Ser. No. 680,624, Jul. 17, 1996, abandoned.

[30] Foreign Application Priority Data

Jul. 18, 1995 [JP] Japan ................................. 7-181407

[51] Int. Cl.[6] ................................................. F25B 39/04
[52] U.S. Cl. ............................ 62/509; 62/125; 165/132
[58] Field of Search ............................ 62/125, 126, 129, 62/507, 509, 199, 200; 165/132, DIG. 354

[56] References Cited

U.S. PATENT DOCUMENTS

| | | | |
|---|---|---|---|
| 5,394,710 | 3/1995 | Matsuo et al. | 165/132 X |
| 5,546,761 | 8/1996 | Matsuo et al. | 62/509 |
| 5,582,027 | 12/1996 | Baba et al. | 62/509 |

FOREIGN PATENT DOCUMENTS

| | | |
|---|---|---|
| A 443271 | 2/1992 | Japan . |
| A7180930 | 7/1995 | Japan . |

Primary Examiner—Harry B. Tanner
Attorney, Agent, or Firm—Harness, Dickey & Pierce, PLC

[57] ABSTRACT

A refrigeration apparatus is constructed by connecting a sight glass via a refrigerant pipe at a downstream side of a supercooling unit of an integrated type condenser-receiver. A required capacity VR of a receiver is obtained by subtracting a required capacity V3 for making the sight glass bubble-free from a total of a refrigerant fluctuation buffer amount V1 for accounting differences in the operating conditions of the refrigeration cycle, and an extra capacity to account for leakage of refrigerant from the refrigeration cycle. Therefore, even when the capacity of receiver is reduced by the required capacity V3 for making the sight glass bubble free, gaseous refrigerant containing bubbles flowing from the receiver are all liquified at the supercooling unit and gaseous refrigerant will never reach the sight glass as long as the refrigeration cycle is filled with the sufficient quantity of refrigerant.

22 Claims, 7 Drawing Sheets

REFRIGERATION CYCLE

This is a continuation of U.S. patent application Ser. No. 08/680,624, filed Jul. 17, 1996, abandoned.

CROSS REFERENCE TO RELATED APPLICATIONS

The present application is based on and claims priority from Japanese Patent Application Hei 7-181407 filed on Jul. 18, 1995, the contents of which are incorporated herein by reference.

BACKGROUND OF THE INVENTION

1. Field of the Invention

The present invention relates to a refrigeration cycle having a variable amount of refrigerant in circulation and which is used for an automotive air conditioner, an automotive freezer or an automotive refrigerator. In particular, the present invention relates to a refrigeration cycle in which a condenser, a receiver, a supercooler and a sight glass are sequentially connected by a refrigerant pipe.

2. Description of Related Art

Conventionally, since a condenser and a receiver, which form a refrigeration cycle of an automotive air conditioner, are connected to a high pressure side of the refrigeration cycle, they must have highly durable structures that will not be deformed and damaged upon application of high pressure. Therefore, highly durable containers such as a header of the condenser or the receiver are preferably formed into cylindrical shapes to satisfy these structural requirements.

One generally known refrigeration cycle that satisfies these requirements has the condenser and the receiver that are provided separately. However, since this refrigeration cycle requires a coupling unit such as a pipe for connecting an outlet of the condenser with an inlet of the receiver, reducing the number of required parts for the refrigeration cycle becomes difficult. Consequently, reducing assembly work and production costs also becomes difficult. Since this refrigeration cycle also requires separate spaces for mounting the condenser and the receiver, then it would occupy a lot of space when installed in a vehicle.

In this way, to address the above-described problems, JP-A Hei-4-43271 discloses an integrated type condenser-receiver which includes an inlet side header for receiving refrigerant from a discharge port of a compressor, a plurality of condenser tubes for condensing the refrigerant provided by the inlet side header through heat exchange with air, an outlet side header connected to outlets of the condenser tubes, a receiver connected to a wall of the outlet side header and which includes a gas-liquid separation chamber formed therein, a sight glass unit which has a sight glass and which is embedded in an upper end opening of the receiver, and a dryer contained in the receiver.

However, for such a conventional integrated type condenser-receivers, a required refrigerant volume capacity of the receiver becomes a total of an amount necessary to make the sight glass bubble-free, an additional capacity in consideration of refrigerant leakage and a refrigerant fluctuation capacity for dealing with differences in the driving conditions of the vehicle. The required capacity of the receiver is generally around 350 to 400 cc. In order to secure such a capacity and, at the same time, make the receiver fit to the outlet side header of the condenser, it will be necessary to enlarge a cross-sectional area of the receiver.

In this way, even though the conventional integrated type condenser-receiver does away with the tube for connecting the condenser with the receiver, there will be an increase in condenser dead space which does not contribute to the heat exchange of the refrigerant with air because the size of the receiver connected to the outlet side header increases.

In particular, while the size of the installation space of the condenser-receiver in the vehicle remains the same, an efficiency of the refrigeration cycle deteriorates because an increased amount of dead space means a corresponding decrease in the effective heat dissipation area of the condenser. Therefore, the size of the receiver must be kept as small as possible in consideration of the efficiency of the refrigeration cycle. Even when the receiver and the condenser are formed independently, the receiver must be kept as small as possible from the point of refrigerant saving.

SUMMARY OF THE INVENTION

In view of the foregoing problems in the prior art in mind, one objective of the present invention is to provide a refrigeration cycle having a compact receiver which is realized by eliminating a required refrigerant capacity for making a sight glass free of bubbles with a supercooler being made to hold a buffer amount of refrigerant. Another objective of the present invention is to provide a refrigeration cycle having an integrated type condenser-receiver which enables reduction of dead space and increases in the effective heat dissipation area of a condenser core.

To achieve these aims, one aspect of the present invention provides a refrigeration cycle which includes a compressor, a condenser of volume capacity VCOND1 having a plurality of condensing tube members and a converging member of volume capacity Vh1, a receiver of required volume capacity VR, a supercooler of volume capacity VCOND2 having a distributing member of volume capacity Vh2 and a supercooling tube member of volume capacity VSC and provided downstream of the receiver, a sight glass provided downstream of the supercooler, a thermostatic expansion valve and an evaporator of volume capacity VEVA. The required capacity VR of the receiver satisfies the following relationship:

$$VR = L \times (V1 + V2 - V3) \text{ cc,}$$

in which L is a predetermined coefficient, $V1 = 1.52 \times 10^{-3} \times (VCOND1 + VCOND2) + 34.3 \times 10^{-3} \times VEVA$ cc, $V2 = 170$ cc and $V3 = 0.65 \times (Vh1 + Vh2 + VSC)$ cc.

In this way, as the supercooler is provided downstream of the receiver and the sight glass is provided downstream of the supercooler, bubbles of the refrigerant will completely disappear within the supercooler and gaseous refrigerant will never reach the sight glass as long as the refrigeration cycle is filled with enough quantity of refrigerant to make bubbles in an outlet of the supercooler disappear (i.e., bubbles condense into a liquid form).

Thus, an amount of refrigerant required to make the sight glass bubble-free becomes unnecessary and it will be necessary to only consider the refrigerant fluctuation amount influenced by differences in operating conditions and an extra capacity to account for refrigerant leakage. Therefore, the receiver can be made compact since the capacity of receiver can be reduced by the amount required for making the sight glass bubble-free. Also, there will be no reductions in the effective heat dissipation area of the integrated type condenser-receiver in which the condenser, the receiver and the supercooler are integrally formed.

Preferably, the aforementioned predetermined coefficient L is set such that L is no less than 0.8 and no more than 1.2.

Moreover, the required capacity VR of the receiver is preferably no less than 100 cc and no more than 200 cc.

Another aspect of the present invention provides a refrigeration cycle which includes a compressor, a condenser of volume capacity VCOND1 having a plurality of condensing tube members and a converging member of volume capacity Vh1, a receiver of required volume capacity VR, a supercooler of volume capacity VCOND2 having a distributing member of volume capacity Vh2 and a supercooling tube member of volume capacity VSC, a sight glass, a first thermostatic expansion valve, a second thermostatic expansion valve connected in parallel with the first thermostatic expansion valve, a first refrigerant evaporator of volume capacity VFEVA, a second refrigerant evaporator of volume capacity VREVA connected in parallel with the first refrigerant evaporator, a refrigerant pipe for connecting the sight glass and the second thermostatic expansion valve, and a switching valve provided along the refrigerant pipe. The required volume VR of the receiver satisfies the following relationship:

$$VR = L \times (V1 + V2 - V3 + V4) \ cc,$$

in which $V4 = VP + 6.5 \times 10^{-2} \times VREVA$ cc and VP is a capacity volume of the refrigerant pipe from the switching valve to the second thermostatic expansion valve.

Preferably, the required volume VR of the receiver is no less than 120 cc and no more than 350 cc.

BRIEF DESCRIPTION OF THE DRAWINGS

Additional objects and advantages of the present invention will become more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are hereinafter described with reference to the accompanying drawings.

Figure 1:
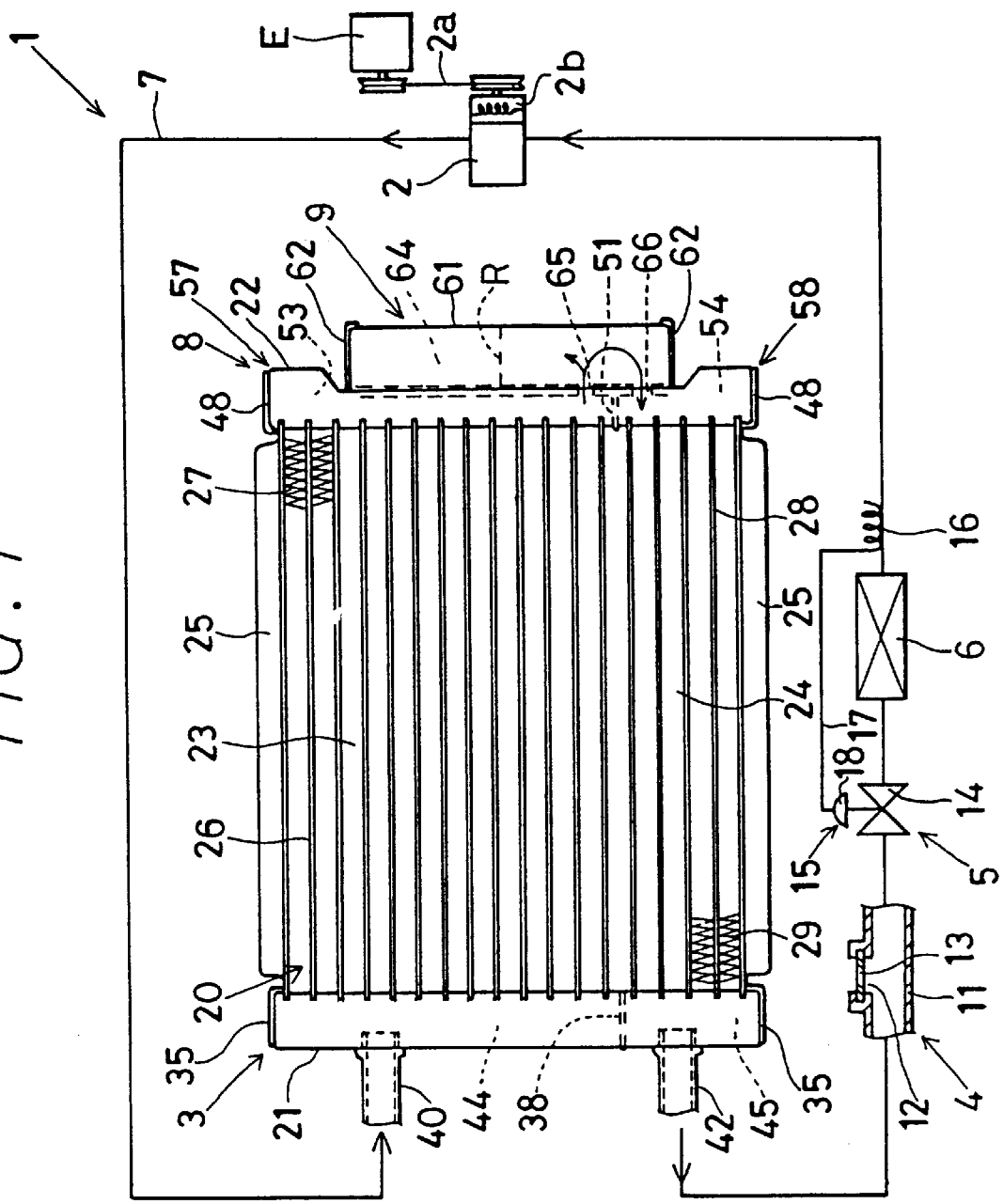
FIG. 1 is a plan view illustrating a construction of a refrigeration cycle of an automotive air conditioner according to a first embodiment of the present invention.
Figure 2:
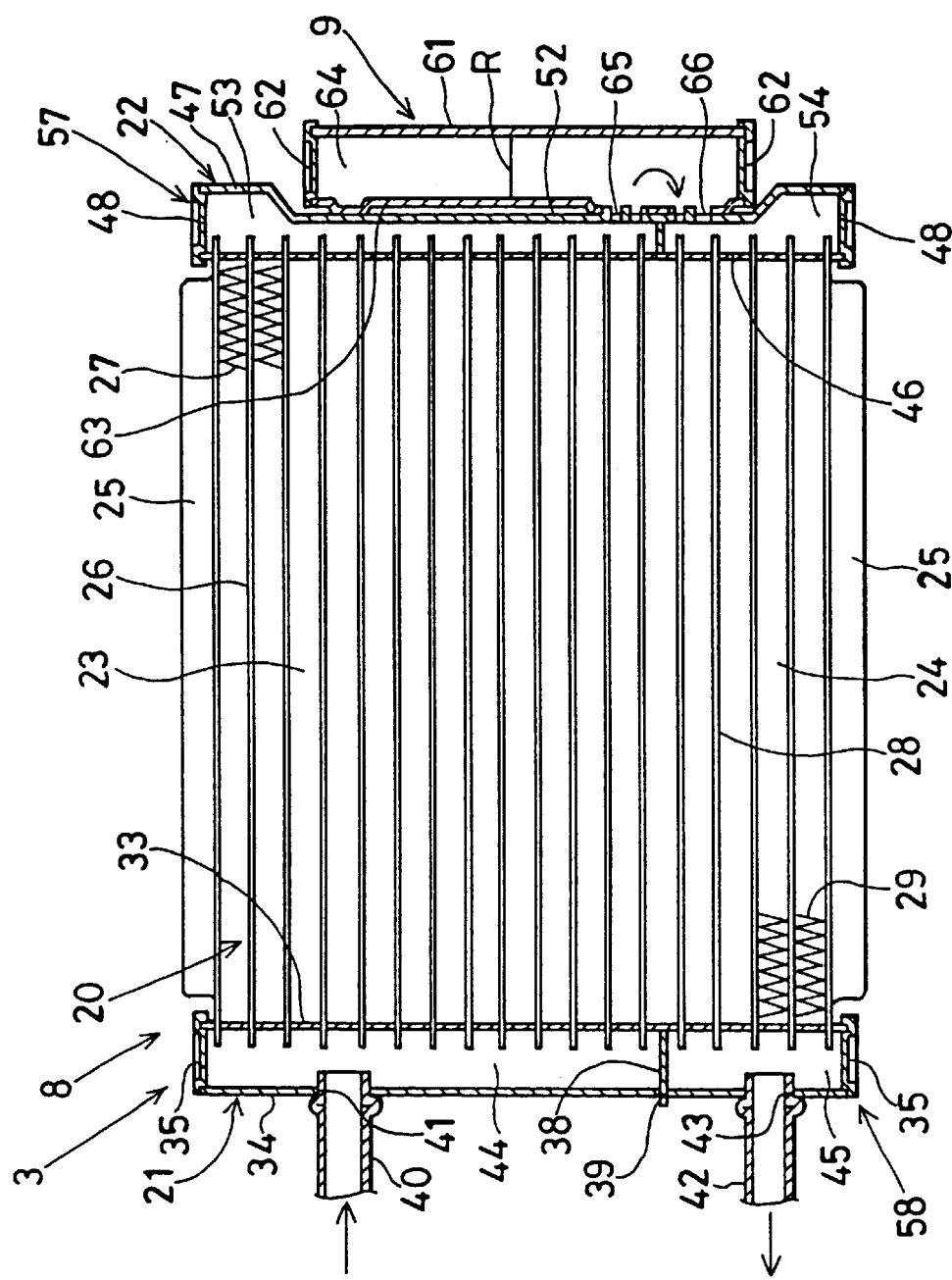
FIG. 2 is a cross sectional view of an integrated type condenser-receiver according to the first embodiment.
Figure 3:
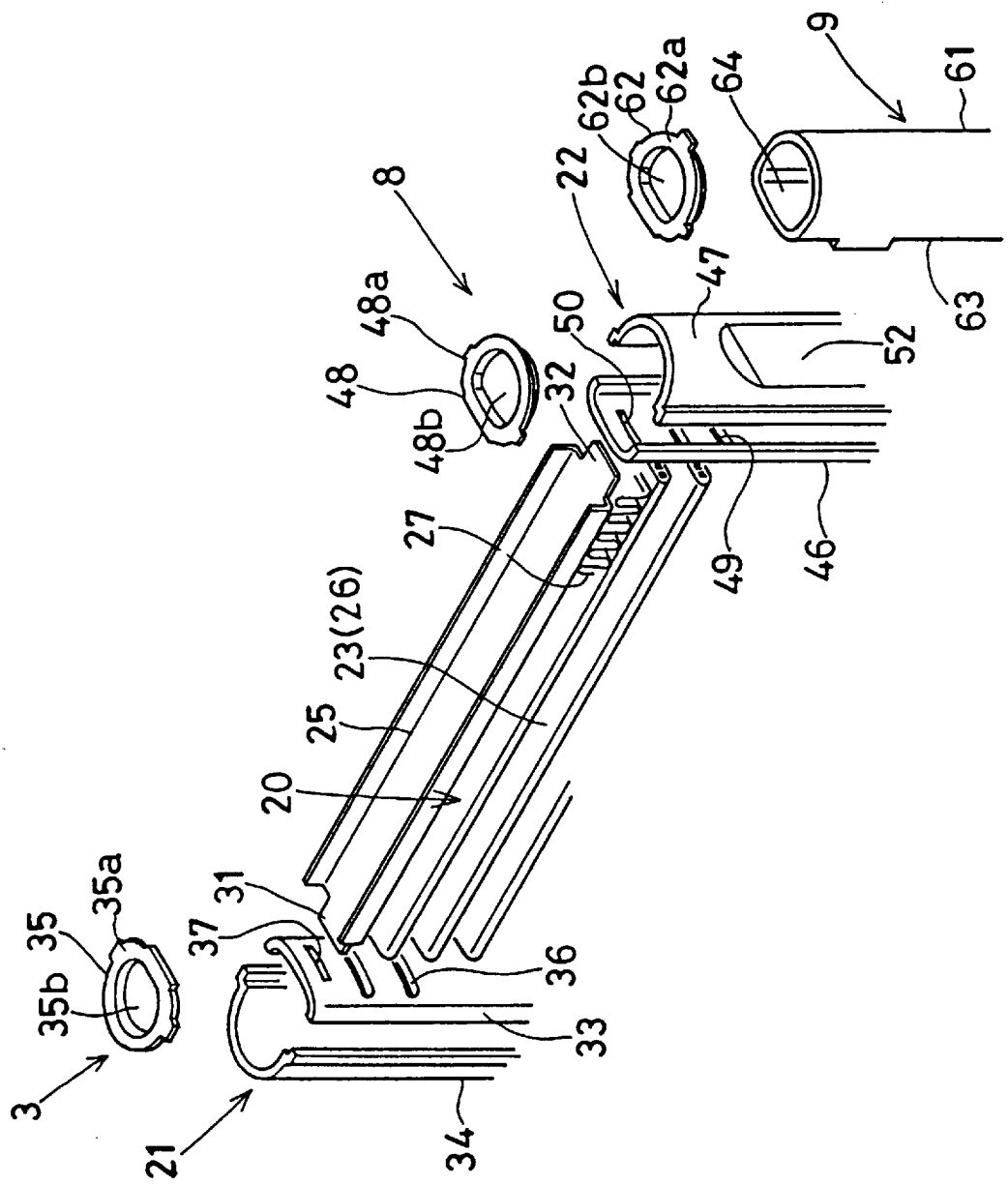
FIG. 3 is an exploded perspective view of the integrated type condenser-receiver according to the first embodiment.

FIGS. 1 through 5 illustrate a first embodiment of the present invention. In particular, FIG. 1 illustrates a refrigeration cycle of an automotive air conditioner, and FIGS. 2 and 3 illustrate an integrated type condenser-receiver used in the refrigeration cycle.

A refrigeration cycle 1 of the automotive air conditioner is a receiver cycle. This refrigeration cycle 1 includes a compressor 2, an integrated type condenser-receiver 3, a sight glass 4, an expansion valve 5, an evaporator 6 and a refrigerant pipe 7 made up of metal or rubber for connecting sequentially the aforementioned components.

The compressor 2 is connected to an engine E, which is disposed within an engine room (not shown) of a vehicle, via a belt 2a and an electromagnetic clutch 2b. This compressor 2 compresses gaseous refrigerant sucked from the evaporator 6 when the rotating power of engine E is transmitted thereto, and provides the high temperature, high pressure gaseous refrigerant to the integrated type condenser-receiver 3.

The sight glass 4 is connected to a refrigerant outlet of the integrated type condenser-receiver 3 via the refrigerant pipe 7. The sight glass 4 operates as a refrigerant quantity checker for checking the quantity of refrigerant within refrigeration cycle 1 through observation of the gas-liquid condition of the refrigerant in circulation. The sight glass 4 is located within the engine room of the vehicle such that inspectors can easily observe the quantity of refrigerant. For example, it may be disposed by itself adjacent to the integrated type condenser-receiver 3 along the refrigerant pipe 7.

Furthermore, as shown in FIG. 1, the sight glass 4 includes a tubular metallic body 11 whose both ends are joined to the refrigerant pipe 7 by welding, fastening or some other joining method, a glass 13 fitted in an observation port 12 formed at the top portion of the metallic body 11 and the like. Generally, the amount of refrigerant enclosed within the refrigeration cycle 1 is determined to be deficient when bubbles are observed in the observation port 12. Otherwise, the amount of enclosed refrigerant is determined to be sufficient when no bubbles are observed in the observation port 12.

The expansion valve 5, which is a thermostatic expansion valve, includes a valve case that forms a throttle valve, a valve body 14 which includes a valve element and the like, and a thermosensitive element 15 for driving the valve element of the valve body 14. In other words, the expansion valve 5 is an automatic thermostatic expansion valve for regulating the amount of refrigerant in circulation within the refrigeration cycle 1 in correspondence with the gaseous condition of the refrigerant in the evaporator 6.

An inlet side of the valve body 14 is connected to the sight glass 4 via the refrigerant pipe 7 and an outlet side of the same is connected to an inlet of the evaporator 6 via the refrigerant pipe 7. The valve body 14 works as a pressure reducer by rapidly expanding the high temperature, high pressure liquid refrigerant that flowed therein from the sight glass 4 and by injecting the liquid refrigerant through a small opening (not shown) to form a low temperature, low pressure gas-liquid two-phased atomized refrigerant.

The thermosensitive element 15 includes a thermosensitive cylinder 16, a capillary tube 17, a driving unit 18 and the like. The thermosensitive cylinder 16, which is filled with gas having the same composition as the refrigerant, works as a refrigerant temperature detector for detecting the degree of superheat of the gaseous refrigerant sucked into the compressor 2 from a suction port. That is, the thermosensitive cylinder 16 is for detecting temperature changes of the refrigerant that flows out from the refrigerant outlet of the evaporator 6.

The capillary tube 17 is disposed in a way that it circumvents the evaporator 6 and forms a pressure guiding passage which connects the interior of the thermosensitive cylinder 16 with the interior of a pressure chamber provided at one side of the driving unit 18. The capillary tube 17 works as pressure communication unit for communicating pressure changes in the thermosensitive cylinder 16 to the pressure chamber provided at one side of the driving unit 18.

The driving unit 18 includes a housing, a diaphragm, bellows and the like, and works as a valve element driver for driving the valve element for regulating the aperture of the opening based on pressure changes in the pressure chamber provided at one side thereof.

When the temperature of the refrigerant flowing from the refrigerant outlet of the evaporator 6 rises, the gas inside the thermosensitive cylinder 16 expands and the expansion valve 5 increases the amount of refrigerant in circulation within the refrigeration cycle 1 by enlarging the opening using the driving unit 18 and the valve element. On the other hand, when the temperature of the refrigerant flowing from the refrigerant outlet of evaporator 6 drops, the gas inside the thermosensitive cylinder 16 contracts and the expansion valve 5 reduces the amount of refrigerant in circulation within refrigeration cycle 1 by tightening the opening using the driving unit 18 and the valve element.

The evaporator 6 is connected between the suction port of the compressor 2 and the outlet of the expansion valve 5. The evaporator 6 is for vaporizing the gas-liquid two-phase refrigerant that flows therein from the refrigerant outlet of the expansion valve 5 by heat transfer between the refrigerant and the outside air or the inside air blown therein by a centrifugal air blower such as a centrifugal fan. That is, the evaporator 6 works as an evaporator and a cooler for further cooling the blown air with the latent heat produced during evaporation.

Next, the integrated type condenser-receiver 3 of the present embodiment will be described in detail with reference to FIGS. 1–3. This integrated type condenser-receiver 3 may be about 300 mm to 400 mm in height and about 300 mm to 600 mm in width. The integrated type condenser-receiver 3 is so disposed in the engine room of the vehicle that it can easily receive air that flows to the engine room during vehicle cruising and is generally installed in front of a radiator.

A receiver and a supercooler are integrated into the condenser to form the integrated type condenser-receiver 3 which includes a radiator 8, the receiver 9 and the like.

The radiator 8 includes a core 20 for performing heat transfer, a first header 21 disposed at one end of the core 20 in a horizontal direction thereof, and a second header 22 disposed at the other end of core 20 in the horizontal direction thereof. All of the above components are made of aluminum and formed integrally by brazing.

Next, the core 20 of the radiator 8 of the present embodiment will be described with reference to FIGS. 1–3. The core 20 includes a condensing unit 23 and a supercooling unit 24. Each of two side plates 25 is joined to the respective upper and lower end portions of the core 20 by brazing or the like.

The condensing unit 23 is composed of a plurality of condensing tubes 26 (which number twelve in the present embodiment) and a plurality of condensing corrugated fins 27. The condensing tubes 26 and the condensing corrugated fins 27 both extend horizontally and are disposed and joined alternately by brazing or the like. The condensing unit 23 is connected to the discharge port of the compressor 2 via the refrigerant pipe 7, and works as a condenser for condensing and liquefying the gaseous refrigerant that flows therein from the compressor 2 by heat transfer with outdoor air blown by a cooling fan (not shown) or the like.

The supercooling unit 24 includes a plurality of supercooling tubes 28 (which number four in the present embodiment) and a plurality of supercooling corrugated fins 29. The supercooling tubes 28 and the supercooling corrugated fins 29 both extend horizontally and are disposed and joined alternately by brazing or the like. This supercooling unit 24 is disposed adjacent to and below the condensing unit 23 which is disposed at the upper side of the core 20, and works as a refrigerant supercooler for supercooling the refrigerant by enabling heat transfer between the liquid refrigerant that flows therein from the receiver 9 and the outside air blown by the cooling fan and the like.

The side plates 25 are for fixing a mounting bracket (not shown) used for mounting the integrated type condenser-receiver 3 on the vehicle. The side plates 25 are shaped into a predetermined shape as shown in FIG. 3 by press-working a metallic plate that has a clad-treated brazing filler metal with aluminum or aluminum alloy material. The side plates 25 have insertion portions 31, 32 that are formed integrally at both ends thereof in the horizontal direction for coupling the side plates 25 to the first and second headers 21, 22 respectively.

The condensing tubes 26 and the supercooling tubes 28 have flat oval cross-sections and are shaped as flat tubes. Moreover, the condensing tubes 26 and the supercooling tubes 28 have a plurality of refrigerant passages formed therein and are made from high corrosion-resistant as well as high heat conductive aluminum or aluminum alloy by die-casting and the like.

Instead of flat tubes, round tubes may also be used for the condensing tubes 26 and supercooling tubes 28. The shapes of the condensing tubes 26 and supercooling tubes 28 need not be the same and may be shaped differently from one other.

Corrugated fins 27, 29 are heat dissipation promoters for improving heat dissipation efficiency of the refrigerant and are radiating fins made into corrugated shapes by press-working a metallic plate that has a clad-treated brazing filler metal with aluminum or aluminum alloy material. Other heat dissipation promoters such as plate fins may be used as radiating fins in place of the corrugated fins 27, 29.

The refrigerant flowing within the plurality of condensing tubes 26 flows from the first header 21 to the second header 22. In other words, the refrigerant flows horizontally from one end of the core 20 to the other end of the core 20, while the refrigerant flowing within the plurality of supercooling tubes 28 flows from the second header 22 to the first header 21. That is, the refrigerant flows horizontally from the other end of the core 20 to the opposite end of the core 20. In the present embodiment, the number of condensing tubes 26 is larger than the number of the supercooling tubes 28. Based on results from experiments, as expressed in Eq. (1), the number of the supercooling tubes 28 is preferably set such that the heat dissipating area of the supercooling unit 24 is 15 to 20% of the area of the core 20 (the effective heat dissipating area of the radiator 8).

$$Acool = Arad \times R \tag{1}$$

It must be noted here that Acool is the heat dissipating area of the supercooling unit 24, Arad is the effective heat dissipating area of the radiator 8 and R is a coefficient set to a value between 0.15 to 0.20.

Next, the first header 21 of radiator 8 of the present embodiment will be explained with reference to FIGS. 1–3. The first header 21 includes a header plate 33 having a roughly U-shaped cross section, a tank plate 34 having a semi-circular arc-shaped cross section and a pair of caps 35, and has an approximately cylindrical body which extends in a vertical direction. The upstream side ends (the inlet side ends) of the plurality of condensing tubes 26 are connected to the upper side part of first header 21, while the downstream side ends (the outlet side ends) of the plurality of supercooling tubes 28 are connected to the lower side part of the first header 21.

The header plate 33 and tank plate 34 are made into the above-mentioned predetermined shapes and integrated by press-working a metallic plate of high corrosion resistance and high thermal conductivity that has a clad-treated brazing filler metal with aluminum or aluminum alloy material.

By press-working, a plurality of flat oval insertion holes 36 are formed on the header plate 33 with a pair of insertion holes 37 smaller than penetration holes 36 formed in both the upper and lower end parts of the same header plate 33. The upstream side ends of the plurality of condensing tubes 26 and the downstream side ends of the plurality of supercooling tubes 28 are inserted into the insertion holes 36. The insertion portions 31, 32 of the sides plate 25 are inserted into the pair of penetration holes 37.

A hole part 39 for fixing a first separator 38 that separates an internal space of tank plate 34 into an upper part and a lower part, a circular refrigerant inlet 41 to which the downstream end of an inlet pipe 40 is inserted, and a circular refrigerant outlet 43 to which the upstream end of an outlet pipe 42 is inserted are formed in the tank plate 34.

The first separator 38 is formed into a substantially disc-like shape and divides an internal space of the first header 21 into an inlet side communicating chamber 44 which communicates with only the refrigerant passages of the plurality of condensing tubes 26, and an outlet side communicating chamber 45 which communicates with only the refrigerant passages of the plurality of supercooling tubes 28.

The inlet pipe 40, which is formed into a tube, is a pipe for guiding the high temperature, high pressure gaseous refrigerant discharged from the discharge port of refrigerant compressor 2 into the inlet side communicating chamber 44, and is joined to the refrigerant inlet 41 by brazing or the like.

The outlet pipe 42 is a pipe for guiding the liquid refrigerant within the outlet side communicating chamber 45 towards the sight glass 4, and is joined to the refrigerant outlet 43 by brazing or the like.

The pair of caps 35 are formed into the shape shown in FIG. 3 by press-working a metallic plate that has a clad-treated brazing filler metal with aluminum or aluminum alloy material. The pair of caps 35 have a semi-annular joining portion 35a, which is joined to the opening portions of both the upper and lower ends of first header 21 by brazing or the like, and a semi-disc shaped blocking portion 35b, which is recessed compared with the joining portion 35a, for blocking the openings of both the upper and lower ends of first the header 21.

Next, the second header 22 of the radiator 8 of the present embodiment will be explained with reference to FIGS. 1–3. The second header 22 includes a header plate 46 having a substantially U-shaped cross section, a tank plate 47 having a semi-circular arc-shaped cross section and a pair of caps 48. Together with the receiver 9, the second header 22 forms an integrated double cylindrical body that extends vertically. The downstream side ends (the outlet side ends) of the plurality of condensing tubes 26 are connected to the upper side part of second header 22, while the upstream side ends (the inlet side ends) of the plurality of supercooling tubes 28 are connected to the lower side part of the second header 22.

The header plate 46 and the tank plate 47 are made into the above-mentioned predetermined integrated shapes by press-working a metallic plate of high corrosion-resistance and high thermal conductivity that has a clad-treated blazing filler metal with an aluminum or aluminum alloy.

A plurality of flat oval penetration holes 49 are formed on the header plate 46, and a pair of penetration holes 50 smaller than the penetration holes 49 are formed on both the respective upper and lower end portions of the header plate 46 by press working. The downstream side ends of the plurality of condensing tubes 26 and the upstream side ends of the plurality of supercooling tubes 28 are inserted into the penetration holes 49. The insertion portions 32 of the side plates 25 are inserted into the pair of penetration holes 50.

A hole part (not shown), which is formed by press-working, for fixing a second separator 51 that divides the internal space of tank plate 47 into an upper part and a lower part and a flat part 52, which comes into contact with the receiver 9, are arranged in the tank plate 47. The receiver 9 is attached to the flat part 52 which is formed by press working.

The second separator 51 is formed into a substantially disc shape and divides the internal space of the second header 22 into an upstream side communicating chamber 53 (a refrigerant converging part) which communicates only to the refrigerant passages of the plurality of condensing tubes 26, and a downstream side communicating chamber 54 (a refrigerant distribution part) which communicates only to the refrigerant passages of the plurality of supercooling tubes 28.

The pair of caps 48 are integrally formed into the shape shown in FIG. 3 by press-working a metallic plate that has a clad-treated blazing filler metal with an aluminum or aluminum alloy. Each cap 48 has a substantially disc-shaped joining portion 48a which is joined to the openings of both the upper and lower ends of the second header 22 by brazing or the like. Each cap 48 also has a semi-disc shaped blocking portion 48b, which is recessed compared with the joining portion 48a, for blocking the openings of both the upper and lower ends of the second header 22.

It must be noted here that the inlet side communicating chamber 44 of the first header 21, the condensing unit 23 of the core 20, and the upstream side communicating chamber 53 of the second header 22 form a condenser 57. Also, it must be noted here that the outlet side communicating chamber 45 of the first header 21, the supercooling unit 24 of the core 20, and the downstream side communicating chamber 54 of the second header 22 form a supercooler 58.

Next, the receiver 9 of the present embodiment will be described in detail with reference to FIGS. 1–3. The receiver 9 works as a gas-liquid separator for separating the refrigerant that flows therein from the condenser 57 into gaseous refrigerant and liquid refrigerant, and providing the liquid refrigerant only to the supercooler 58. The receiver 9 has a cylindrical body 61 and a pair of caps 62. A required volume capacity VR of the receiver 9 is preferably no less than 100 cc and no more than 200 cc.

The cylindrical body 61 is made of aluminum or aluminum alloy and is formed into a substantially cylindrical shape having a flat part 63 facing the tank plate 47. The cylindrical body 61 is formed into the substantially cylindrical shape by press working or extruding a plate material whose surfaces are both clad-treated. The flat part 63 works as a fitting portion that is installed to the second header 22. The flat part 52 of the tank plate 47 and the flat part 63 of cylindrical body 61 reduce the protrusion of the second header 22 in the horizontal direction, and are so disposed to secure a space between the cylindrical body 61 and the tank plate 47 for brazing.

An internal space of the cylindrical body 61 includes a gas-liquid separating chamber 64 which is a receiver portion. The gas-liquid separating chamber 64 communicates with the interior of the upstream side communicating chamber 53 via a substantially rectangular refrigerant inlet 65 (a first communicating part) disposed in the vicinity of the bottom of the upstream side communicating chamber 53 near the second separator 51, and also communicates to the interior of the downstream side communicating chamber 54 via a substantially rectangular refrigerant outlet 66 disposed at the downstream side communicating chamber 54. A liquid refrigerant surface (gas-liquid boundary) level R of the gas-liquid separating chamber 64 shown in FIG. 2 indicates the level of sufficient refrigerant quantity in the refrigeration cycle 1 under normal conditions.

A pair of caps 62 are made into the shape illustrated in FIG. 3 by press-working a metallic plate that has a clad-treated brazing filler metal with aluminum or aluminum alloy material, and are formed integrally. The pair of caps 62 have a substantially annular joining portion 62a, which is joined to the opening portions of both the upper and lower ends of the cylindrical body 61 by brazing or the like, and a semi-disc shaped blocking part 62b, which is recessed compared with the joining portion 62a, for blocking the opening parts of both the upper and lower ends of the cylindrical body 61.

The gas-liquid separating chamber 64 separates the refrigerant that flows therein from upstream side communicating chamber 53 into gaseous refrigerant and liquid refrigerant, and sends only the liquid refrigerant to the downstream side communicating chamber 54. In the present embodiment, the flat part 52 of the tank plate 47 and the flat part 63 of the cylindrical body 61 form a divider for separating the upstream side communicating chamber 53 and the downstream communicating chamber 54 from the gas-liquid separating chamber 64.

Furthermore, in the present embodiment, as shown in FIGS. 1–3, the upper end of the receiver 9 is lower than the upper end of second header 22, and the lower end of receiver 9 is set higher than the lower end of second header 22. In this way, the length of receiver 9 in the vertical direction is shorter than that of the second header 22.

The refrigerant inlet 65 opens at the lower part of upstream side communicating chamber 53 (the lowermost part of condenser 57) and allows the refrigerant within the upstream side communicating chamber 53 to flow into a portion of the gas-liquid separating chamber 64 that is lower than the refrigerant liquid surface level R.

The refrigerant outlet 66 opens at a position lower than the refrigerant inlet 65 and allows the liquid refrigerant within the gas-liquid separating chamber 64 to flow into downstream side communicating chamber 54.

Next, a way for determining the required content volume VR of the receiver 9 is explained with reference to FIGS. 4 and 5. Here, FIG. 4 is a graph illustrating a flow movement of the refrigerant within the integrated type condenser-receiver 3 with respect to the amount of refrigerant in the refrigeration cycle 1.

Figure 4:
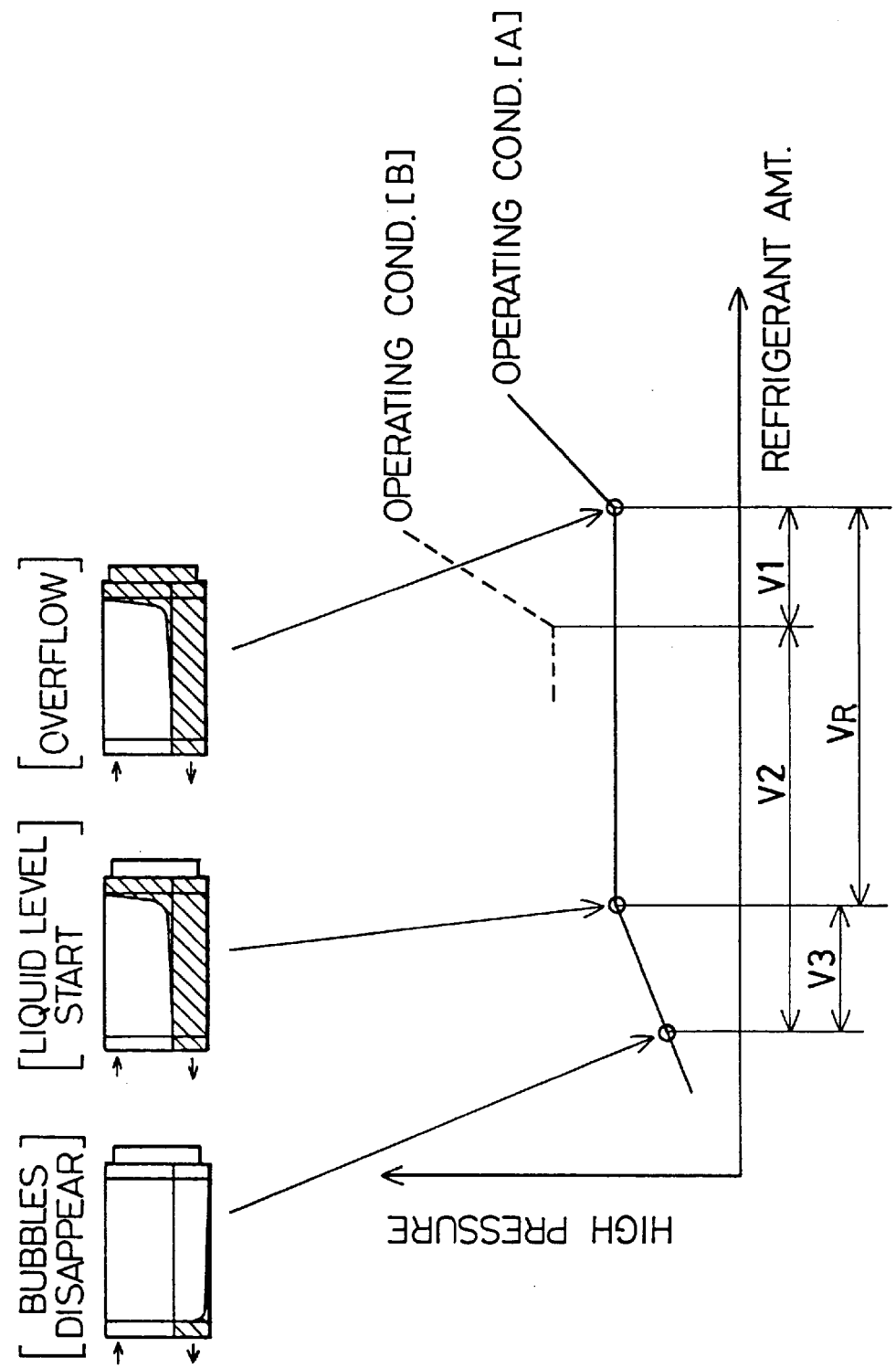
FIG. 4 is a graph showing movement of a refrigerant in the integrated type condenser-receiver according to the first embodiment.
Figure 5:
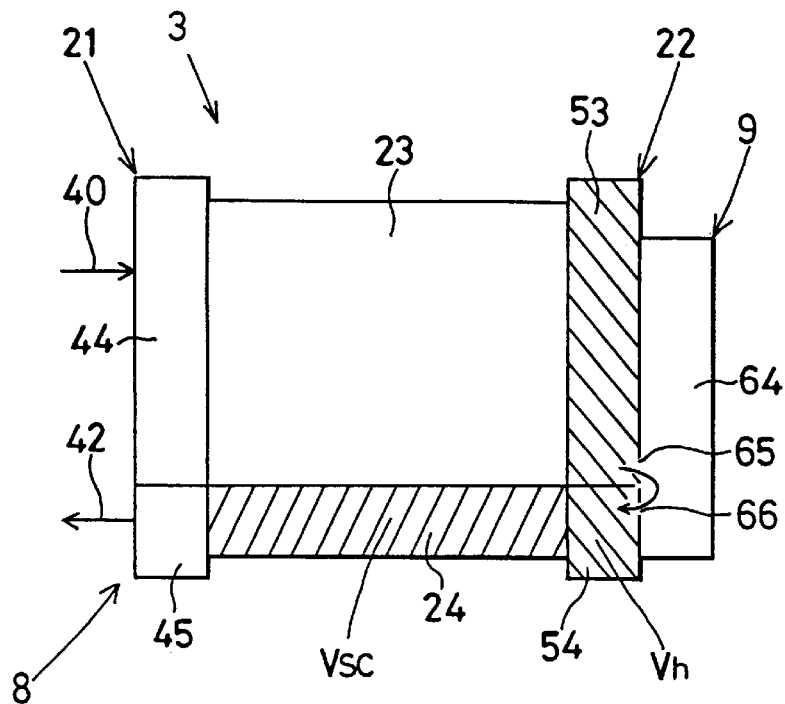
FIG. 5 is a plan view illustrating the integrated type condenser-receiver according to the first embodiment.

V1 in the graph of FIG. 4 is a refrigerant fluctuation margin which is set in consideration of differences in the operating conditions of the refrigeration cycle 1 (e.g, changes in freeze load, changes in the amount of refrigerant in circulation in the refrigeration cycle 1). The refrigerant fluctuation within the refrigeration cycle 1 is caused by changes in the existing quantity of refrigerant within the integrated type condenser-receiver 3 in accordance with the refrigerant density changes brought by high pressure in each part of the integrated type condenser-receiver 3 and changes in the condensing temperature.

In this case, the densities of the refrigerant in the refrigerant pipe 7 and the compressor 2 hardly change and thus, the volume content of the condenser 57 and the evaporator 6 mainly influence the refrigerant fluctuation margin V1. That is, the existing quantity of refrigerant in the condenser 57 changes depending on degree of superheating of the refrigerant at the inlet thereof and the condensing pressure therein, and the existing quantity of refrigerant in the evaporator 6 changes depending on the degree of dryness, which is a function of the condenser pressure and the evaporation pressure, of the inlet thereof and the evaporating pressure therein. Furthermore, in case the expansion valve 5 is a thermostatic valve as in the present embodiment, the refrigerant fluctuation margin will also be influenced by the degree of superheating of the outlet of the evaporator 6.

Here, when the volume capacity of the integrated type condenser-receiver 3, that is, a sum of a capacity VCOND1 of the condenser 57 and a capacity VCOND2 of the supercooler 58 is defined as VCOND and the capacity of the evaporator 6 is defined as VEVA, the refrigerant fluctuation margin V1 of the refrigeration cycle 1 in accordance with the differences of operating conditions can be expressed by the following Eq. (2) obtained through experiments.

$$V1 = (a1 \times VCOND + a2 \times VEVA) \; cc \qquad (2)$$

Next, V3 in FIG. 4 is an amount of refrigerant stored in the integrated type condenser-receiver 3 from a bubble-free state to the start of supply of liquid refrigerant to the receiver 9. As shown in FIG. 5, the capacity of the plurality of supercooling tubes 28 of the supercooling unit 54 is defined as VSC and the sum of a capacity Vh1 of the upstream side communicating chamber 53 of the second header 22 from which the refrigerant flows to the receiver 9 and a capacity Vh2 of the downstream side communicating chamber 54 to which the refrigerant from the receiver 9 flows to is defined as Vh, the refrigerant quantity V3 is expressed using the following Eq. (3) which was obtained through experiments.

$$V3 = a3 \times (Vh + VSC) \; cc \qquad (3)$$

Next, V2 in the graph of FIG. 4 is a buffer amount of refrigerant in consideration of leakage of refrigerant from the refrigeration cycle 1. This buffer amount V2 is expressed in Eq. (4) where gm (g/year) is a yearly leakage amount from the refrigeration cycle 1, n is the number of years of warranty of the refrigeration cycle 1 and $\rho$ is the density of liquid refrigerant at a condensing temperature (i.e., 60° C.) under normal operating conditions.

$$V2 = (gm \times n)/\rho \; cc \qquad (4)$$

It must be noted here that coefficients a1, a2 and a3 stated above are set to the following values obtained through various experiments.

$$a1 = 1.52 \times 10^{-3} \; a2 = 34.3 \times 10^{-3} \; a3 = 0.65 \; gm = 15 g/\text{year} \; \rho = 1.05 g/cc$$

With the number of years of warranty set to 12 years, Table 1 expresses the estimated required capacities VR of the receiver 9 of the refrigeration cycles of major car types (i.e, A type which is the subcompact vehicle type whose exhaust volume is 660 cc, B type which is the compact vehicle type whose exhaust volume is 1600 cc and C type which is the medium-sized vehicle type whose exhaust volume is 2800 cc) obtained based on the aforementioned Eqs. 2–4.

TABLE 1

|        | VCOND (cc) | VSC + Vh (cc) | VEVA (cc) | VR (cc) |
|--------|------------|---------------|-----------|---------|
| A-type | 200        | 45            | 600       | 160     |
| B-type | 350        | 80            | 950       | 150     |
| C-type | 400        | 120           | 1200      | 130     |

Taking car type A as an example, the required capacity VR for receiver 9 is calculated by entering the values shown in Table 1 into the aforementioned Eqs. 1–4. In this way, VR is computed as follows.

$$V1 = (1.52 \times 10^{-3} \times 200 + 34.3 \times 10^{-3} \times 600) \approx 21 \ cc \qquad (5)$$

$$V2 = (15 \times 12)/1.05 \approx 170 \ cc$$

$$V3 = 0.65 \times 45 \approx 29 \ cc$$

$$V1 + V2 - V3 = 21 + 170 - 29 \approx 162 \ cc$$

$$VR \geq b1 \times (V1 + V2 - V3) \ cc$$

$$VR \leq b2 \times (V1 + V2 - V3) \ cc$$

It must be noted here that b1 and b2 are coefficients set so that the above calculated values for the refrigeration cycles of the various vehicle types can cope with variations in predetermined required capacity of the receiver 9 (three to five types). Coefficients b1 and b2 are set to 0.8 and 1.2, respectively.

Therefore, the lower limit of the required capacity VR of the receiver 9 of the A type car becomes 130 cc while the upper limit for the same becomes 194 cc. In this way, the required capacity of receiver 9 is preferably set within this range. While required capacity VR of the receiver 9 of the A type vehicle is set to 160 cc in TABLE 1, VR is most preferably set to 162 cc.

Taking the case of B car type as the second example, the required capacity VR of the receiver 9 is calculated by entering the values shown in Table 1 into the aforementioned Eqs. 1–4. In this way, VR is computed as follows.

$$V1 = (1.52 \times 10^{-3} \times 350 + 34.3 \times 10^{-3} \times 950) \approx 33 \ cc \qquad (6)$$

$$V2 = (15 \times 12)/1.05 \approx 170 \ cc$$

$$V3 = 0.65 \times 80 \approx 52 \ cc$$

$$V1 + V2 - V3 = 33 + 170 - 52 \approx 151 \ cc$$

$$VR \geq 0.8 \times (V1 + V2 - V3) \ cc$$

$$VR \leq 1.2 \times (V1 + V2 - V3) \ cc$$

Therefore, the lower limit of the required capacity VR of the receiver 9 of the B type car becomes 121 cc while the upper limit of the same becomes 181 cc. In this way, the required capacity of the receiver 9 is preferably set within this range. While the required capacity VR of the receiver 9 of the B type vehicle is set to 150 cc in TABLE 1, required capacity VR is most preferably set to 151 cc.

Taking the case of the C car type as the third example, the required capacity VR of the receiver 9 is calculated by entering the values shown in Table 1 into the aforementioned Eqs. 1–4. In this way, VR is computed as follows.

$$V1 = (1.52 \times 10^{-3} \times 400 + 34.3 \times 10^{-3} \times 1200) \approx 42 \ cc \qquad (7)$$

$$V2 = (15 \times 12)/1.05 \approx 170 \ cc$$

$$V3 = 0.65 \times 120 \approx 78 \ cc$$

$$V1 + V2 - V3 = 42 + 170 - 78 \approx 134 \ cc$$

$$VR \geq 0.8 \ (V1 + V2 - V3) \ cc$$

$$VR \leq 1.2 \ (V1 + V2 - V3) \ cc$$

Therefore, the lower limit of the required capacity VR for receiver 9 of the C type car becomes 107 cc and the upper limit of the same becomes 161 cc. In this way, the required capacity of the receiver 9 is preferably set within this range. While the required capacity VR of the receiver 9 of the C type vehicle is set to 130 cc in TABLE 1, required capacity VR is most preferably set to 134 cc.

Meanwhile, the mode of operation of the present embodiment will be briefly described with reference to FIGS. 1–3.

When the operation of the automotive air conditioner starts, the electromagnetic clutch 2b is actuated and the compressor 2 is driven by the engine E via the belt 2a and the electromagnetic clutch 2b. Accordingly, the high temperature, high pressure gaseous refrigerant compressed within the compressor 2 and discharged therefrom flows into the inlet side communicating chamber 40 via the refrigerant pipe 7 and the inlet pipe 40. The refrigerant that flows into the inlet side communicating chamber 44 is distributed to the plurality of condensing tubes 26.

While the gaseous refrigerant is flowing through the refrigerant passages of the condensing tubes 26, heat is transferred from the gaseous refrigerant to the outdoor air via the condensing corrugated fins 27. Almost all of the gaseous refrigerant is condensed into a liquid state except for a small amount which remains in the gaseous phase state. The refrigerant flows into the upstream side communicating chamber 53 of the second header 22 from the plurality of condensing tubes 26 and converge in the upstream side communicating chamber 53. With this arrangement, fine bubbles of gaseous refrigerant flowing out of the downstream end of the plurality of condensing tubes 26 are gathered in the upstream side communicating chamber 53 to form large bubbles of gaseous refrigerant which are buoyed up by buoyant forces.

The gaseous and liquid refrigerant flowing into the upstream side communicating chamber 53 flow into the gas-liquid separating chamber 64 of receiver 9 via the refrigerant inlet 65 opening at the lower part of upstream side communicating chamber 53, and further flow into the liquid refrigerant disposed at a portion of the gas-liquid separating chamber 64 lower than liquid surface level R. In the gas-liquid separating chamber 64, gas-liquid separation of the refrigerant is performed by taking advantage of reduced speed of the refrigerant which is done by enlarging a cross-sectional area of the chamber 64 to some extent and by taking advantage of the buoyant effects of the bubble-form gaseous refrigerant.

Since the refrigerant flows into the liquid refrigerant disposed in the lower portion of the gas-liquid separating chamber 64 via the refrigerant inlet 65 from the upstream side communicating chamber 53, ripples at the refrigerant liquid surface R due to the flow of the refrigerant into the gas-liquid separating chamber 64 are not generated and thus, gas-liquid separation is performed properly. In particular, there will be no ripples generated at the refrigerant liquid surface R even when a large quantity of the refrigerant is in circulation such as during the high speed operation of the compressor 2. Therefore, since the gas-liquid separation is performed smoothly without any particular need for enlarging a cross-sectional area of the receiver 9, a stable gas-liquid boundary is formed within the receiver 9.

Moreover, with the provision of the second separator 51, the separation of gaseous and liquid refrigerant using the buoyant force acting on the gaseous refrigerant is further facilitated with a longer flow passage between the lowermost condensing tube 26 of the plurality of condensing tubes 26 to the uppermost supercooling tube 28 of the plurality of supercooling tubes 28.

Further, with the provision of the second separator 51, the refrigerant flowing from the plurality of condensing tubes 26 into the second header 22 makes a U-turn before flowing into the plurality of supercooling tubes 28 and thus, the fine bubbles of gaseous refrigerant generated from the downstream ends of the condensing tubes 26 are gathered in the upstream side communicating chamber 53. Then, these fine bubbles of gaseous refrigerant form larger bubbles which are more likely to be buoyed up by the buoyant forces, and, as a result, the gaseous refrigerant is separated from the liquid refrigerant by a centrifugal force and is gathered at one portion.

In this way, the gas-liquid refrigerant is separated by the centrifugal force and the bubbles of the gaseous refrigerant gather to form larger bubbles of gaseous refrigerant. As a result, since the gaseous refrigerant is buoyed up to a significant extent, the separation of the refrigerant into gaseous refrigerant and liquid refrigerant is facilitated. Therefore, the refrigerant is more likely to be separated into gaseous refrigerant and liquid refrigerant when it flows into the gas-liquid separating chamber 64 from refrigerant inlet 65, with the gaseous refrigerant likely staying in the upper part of the gas-liquid separating chamber 64 and the liquid refrigerant likely staying in the lower part of the same gas-liquid separating chamber 64.

Therefore, when the refrigeration cycle 1 is filled with the refrigerant of the quantity sufficient to form a gas-liquid boundary within the receiver 9 (gas-liquid separating chamber 64), only the liquid refrigerant which is not supercooled flows from the refrigerant outlet 66 located at the lower part of the gas-liquid separating chamber 64 into the downstream side communicating chamber 54. The refrigerant flowing into the downstream side communicating chamber 54 is distributed to the plurality of supercooling tubes 28 connected thereto.

The refrigerant flowing into the plurality of supercooling tubes 28 exchange heat with the outdoor air through supercooling corrugated fins 29 to become the supercooled liquid refrigerant that flows into the outlet side communicating chamber 45 of the first header 21.

The liquid refrigerant flowing into the outlet side communicating chamber 45 flows to the valve body 14 of the expansion valve 5 via the outlet pipe 42 and the sight glass 4. It must be noted here that as the valve body 14 is not supplied with gaseous refrigerant generated from pressure loss in the outlet pipe 42 or heat from the engine room, there will be no reductions in the circulation quantity of the liquid refrigerant flowing into valve body 14. As a result, a sufficient quantity of atomized refrigerant is supplied into the evaporator 6 and therefore the deterioration in the refrigeration ability of the refrigeration cycle 1 can be prevented.

In this way, in the present embodiment, since the supercooler 58 is provided in the downstream side of the receiver 9, even if the gas-liquid separation within receiver 9 is not complete, the refrigerant bubbles will completely disappear within the supercooler 58. As the sight glass 4 is placed in the downstream side of the supercooler 58, there is no need to ensure the perfect separation of the refrigerant into gaseous and liquid refrigerant within the receiver 9 in order to eliminate the quantity of refrigerant needed to make the sight glass 4 bubble-free.

That is, since the refrigerant is cooled at the integrated type condenser-receiver 3 to a state where all the refrigerant can be liquified at the supercooler 58, the bubbles of the refrigerant passing through the sight glass 4 will disappear at a point the refrigeration cycle is filled with sufficient quantity of refrigerant. At this point, since the receiver 9 is filled with gaseous refrigerant having large specific capacity, the capacity of the receiver 9, which is equal to the cross-sectional area of the gas-liquid separating chamber 64, can be used mostly to account for fluctuations in the amount of refrigerant due to changes in the load of the refrigeration cycle 1, differences in the operating conditions of the vehicle as well as leakage of refrigerant.

As the sight glass 4 is connected to the downstream side of the supercooler 58, the difference in the quantity of refrigerant from the bubble-free state to the point when refrigerant overflows in the receiver 9 can also be used to account for the fluctuations in the amount of refrigerant discussed above. In other words, the capacity of the receiver 9 can be reduced by the refrigerant quantity which accumulates in the supercooler 58 and the condenser 57 from the bubble-free state point to the start of liquid flow to the receiver 9.

As a result, as the required capacity of the receiver 9, in other words, the cross-sectional area of the gas-liquid separating chamber 64, can be reduced, the receiver 9 can be made compact. Therefore, since a dead space not contributing to the heat exchange of the refrigerant with the air is reduced even with the integrated type condenser-receiver 3, there will be no reduction of the effective heat dissipating areas of the condenser 57 and the supercooler 58.

Furthermore, in the present embodiment, since the integrated type condenser-receiver 3 is connected between the discharge port of the compressor 2 and the inlet of the sight glass 4 via the refrigerant pipe 7, productivity of refrigeration cycle 1 improves with the reduction of the number of required parts, which translates to reductions in the production cost. Also, the integrated type condenser-receiver 3 takes up less space in the engine room of the vehicle.

Figure 6:
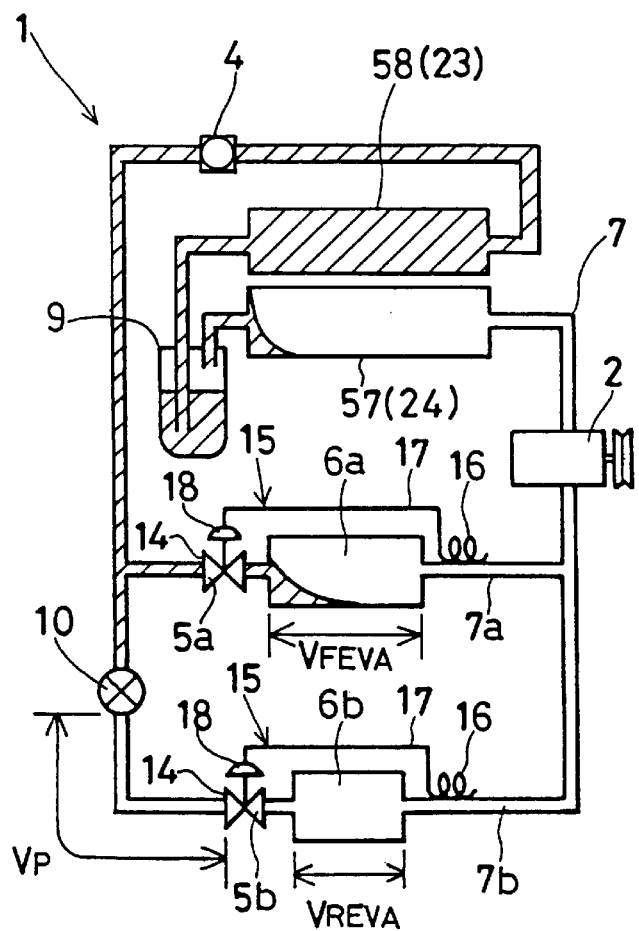
FIG. 6 is a plan view illustrating a single operation of a refrigeration cycle of a dual type air conditioner according to a second embodiment of the present invention.
Figure 7:
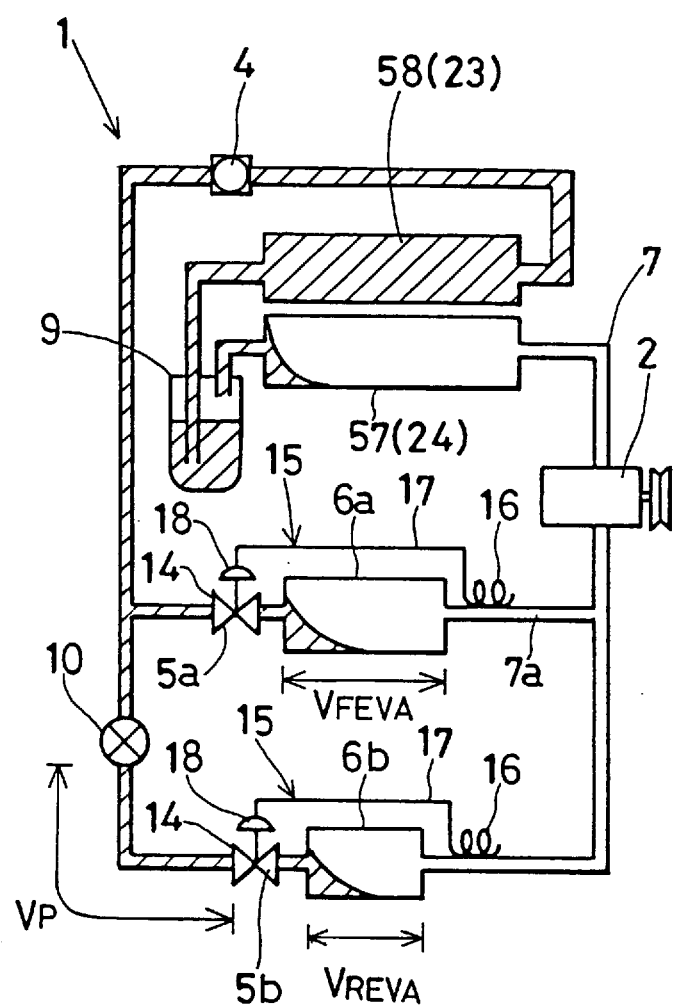
FIG. 7 is a plan view illustrating a dual operation of the refrigeration cycle of the dual type air conditioner according to the second embodiment.

Hereinafter, a second embodiment of the present invention is explained with reference to FIGS. 6 and 7. FIG. 6 shows a single operation of a refrigeration cycle of an automotive air conditioner while FIG. 7 shows a dual operation of the same.

The refrigeration cycle 1 of the automotive air conditioner of the present embodiment is a receiver cycle which is applied to a dual air conditioner having a front cooler in the front part of a driving room of the vehicle and a rear cooler in a trunk room of the same, an overhead dual air conditioner having the front cooler in the front part of a driving room of a wagon vehicle and the rear cooler on a ceiling part of the same, or to a twin air conditioner having an air conditioner in the front part of the driving room of the wagon vehicle and the rear cooler on the side wall portion of the vehicle body and so on.

A front side refrigerant pipe 7a (first refrigerant passage) having a front side expansion valve 5a (first thermostatic expansion valve) and an evaporator 6a (first refrigerant evaporator) for a front cooler, and a rear side refrigerant pipe 7b (second refrigerant passage) having a rear side expansion valve 5b (second thermostatic expansion valve) and an evaporator 6b (second refrigerant evaporator) for a rear cooler are connected in parallel in the refrigeration cycle 1.

Here, the condenser 57, the receiver 9 and the supercooler 58 may be integrally formed (as in the integrated type condenser-receiver 3 of the first embodiment) or provided separately.

A rear side switching valve 10, such as an electromagnetic valve, which opens when actuated and closes when deactuated, is disposed on the rear side refrigerant pipe 7b. The switching valve 10 switches the refrigeration cycle 1 either to a single operation (shown in FIG. 6) which closes the rear side refrigerant pipe 7b or to a dual operation (shown in FIG. 7) in which the rear side refrigerant pipe 7b is open.

The required volume capacity VR of the receiver 9 in the present embodiment is computed using the following Eqs. (8).

$$V1=(1.52\times10^{-3}\times VCOND+34.3\times10^{-3}\times VFEVA)\ cc \quad (8)$$

$$V2=170\ cc$$

$$V3=0.65\times(Vh+VSC)\ cc$$

It must be noted here that VCOND is a total of the capacity VCOND1 of the condenser 57 and the capacity VCOND2 of the supercooler 58 and VFEVA is a capacity of the evaporator 6a of the front cooler, VSC is a capacity of the supercooling tube unit, and Vh is a total of the capacity Vh1 of the final refrigerant convergence member of the condenser 57 and the capacity Vh2 of the first refrigerant distribution member of the supercooler 58.

There is a need to add a buffer capacity V4 to the refrigerating fluctuation capacity of the refrigeration cycle 1 to account for differences of operating conditions between the single operation and the dual operation of the refrigeration cycle 1. This buffer capacity V4 for the refrigerant fluctuation is mainly influenced by the capacity (internal capacity) VP of the rear side refrigerant pipe 7b from the rear side switching valve 10 to the expansion valve 5b, and the capacity (internal capacity) VREVA of the refrigerant evaporator of the rear cooler.

The following Eq. (9) has been obtained through various experiments.

$$V4=VP+a4\times VREVA\ cc \quad (9)$$

Based on various experiments, it must be noted here that coefficient a4 is set to $6.5\times10^{-2}$.

The values of VP and VREVA in present use have the following ranges: VP is from 5 to 120 cc and VREVA is from 150 to 500 cc. Therefore, V4 is from about 15 to about 150 cc.

Therefore, the required capacity VR of the receiver 9 of refrigeration cycle 1 having the rear cooler is expressed as in Eq. (10).

$$VR=(V1+V2-V3+V4)\ cc \quad (10)$$

The required refrigerant capacity of the receiver 9 should preferably be within a range of (V1+V2−V3+V4)×(0.8 to 1.2). This 0.8 to 1.2 range is to account for variations in the calculated values so that these values can cope with a variation of the predetermined required capacities of the receiver 9 (about three to five different types), as in the first embodiment. In addition, it must be noted here that the required capacity V4 of the receiver 9 is preferably set no less than 120 cc and no more than 350 cc.

Figure 8:
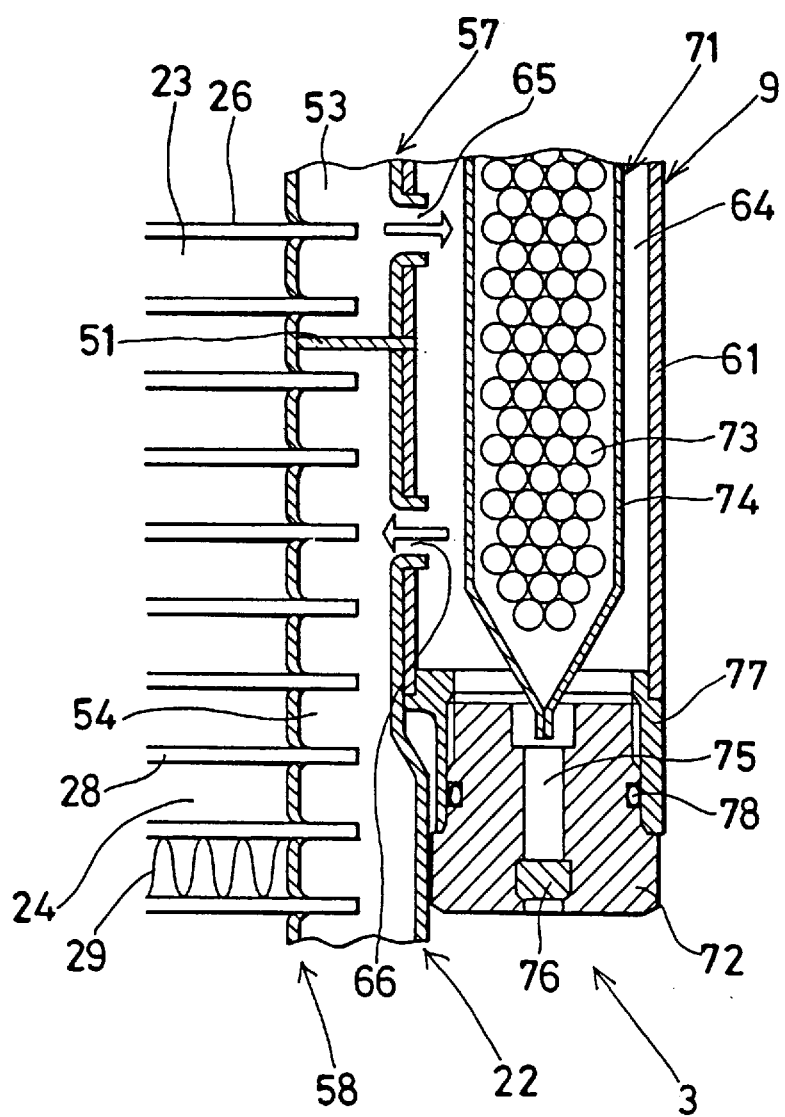
FIG. 8 is a cross-sectional view of a dryer contained in a receiver of the integrated type condenser-receiver according to a third embodiment of the present invention.

Hereinafter, a third embodiment of the present invention is explained with reference to FIG. 8 which shows an integrated type condenser-receiver having a built-in dryer.

The receiver 9 in the present embodiment includes a cylindrical body 61, a dryer 71 accommodated detachably within the cylindrical body 61, a cap (not shown) for blocking an opening of an upper end of the cylindrical body 61, and a fusible plug 72 for blocking an opening part of a lower end of the cylindrical body 61. A required capacity VR of the receiver 9 is a capacity of the receiver 9 minus the capacity of the dryer 71.

A plurality of Freon refrigerant desiccants 73 such as synthetic zeolite, alumina gel, silica-alumina adsorbent such as silica gel are used as the dryer 71.

Troubles occur in the refrigeration cycle equipment when the desiccants 73 disintegrate and flow to the refrigeration cycle 1 after being pulverized due to wear and tear after a long period of usage. Therefore, in the present embodiment, the desiccants 73 are placed in a filtering bag 74 which functions as a filter for confining the pulverized powder of the plurality of desiccants 73. The plurality of desiccants 73 can be also placed in a bag made of felt (waterproof heavy duty paper).

The fusible plug 72 is made up of aluminum alloy and is a melt bolt whose hole 75 at a middle portion thereof is inserted with a special soldering material 76 (soluble material which is melted at, for example, 100°–105° C.). That is, the fusible plug 72 is a functional component for preventing trouble in the refrigeration cycle equipment such as the condenser 57, the supercooler 58, the receiver 9 and the like.

The fusible plug 72 is fixed to the receiver 9 by thrusting it into a cylindrical body 77 which forms an opening part of the lower end of the receiver 9. An O-ring 78 fitted between the periphery of the fusible plug 72 and the inner circumference of the cylindrical body 77 is used as the sealing material for preventing the external leakage of the refrigerant. The cylindrical body 77 is formed into cylindrical shape by cutting and processing a metal block and is joined to the lower end of receiver 9 by brazing and the like.

It must be noted here that while the present invention is applied to the refrigeration cycle 1, it can also be applied to a refrigeration cycle of an automotive freezing device, an automotive refrigeration device or an automotive air conditioner such as an automotive heater and cooler. The present invention may be also applied to a stationary refrigeration cycle of a household air conditioning device, an industrial use air conditioning device and the like.

Although the present invention has been fully described in connection with preferred embodiments thereof with reference to the accompanying drawings, it should be noted that various changes and modifications will become apparent to those skilled in the art.

For example, while the condenser 57, the receiver 9 and the supercooler 58 are integrally formed in the integrated type condenser-receiver 3, any of these devices may be grouped together or formed separately from each other.

In addition, while the refrigerant inlet 65 from the condenser 57 to the receiver 9 is provided in the lowermost end of the condenser 57 in the above-described embodiments, it may also be provided in the upper end or in the middle portion thereof.

Also, while only one of each refrigerant inlet 65 and refrigerant outlet 66 are provided in the foregoing embodiments, additional refrigerant inlets and outlets may also be provided.

Such changes and modifications are to be understood as being included within the scope of the present invention as defined by the appended claims.

What is claimed is:

1. A refrigeration apparatus comprising:
   a compressor for compressing refrigerant;
   a condenser of volume capacity VCOND1, said condenser having a plurality of condensing tube members for condensing said refrigerant that flows therein from said compressor and a converging member of volume capacity Vh1 for converging said refrigerant that flows therein from said plurality of condensing tube members;

a receiver of required volume capacity VR for separating said refrigerant from said converging member of said condenser into gaseous refrigerant and liquid refrigerant and discharging said liquid refrigerant;

a supercooler of volume capacity VCOND2, said supercooler having a distributing member of volume capacity Vh2 for distributing said refrigerant discharged by said receiver and a supercooling tube member of volume capacity VSC for supercooling said refrigerant that flows therein from said refrigerant distributing member;

a thermostatic expansion valve for expanding said refrigerant that flows therein; and an evaporator of volume capacity VEVA for evaporating said refrigerant that flows therein from said thermostatic expansion valve, wherein said VR satisfies the following relationship:

$$VR = L \times (V1 + V2 - V3) \; cc,$$

in which $$V1 = 1.52 \times 10^{-3} \times (VCOND1 + VCOND2) + 34.3 \times 10^{-3} \times VEVA \; cc,$$

$$V2 = 170 \; cc,$$

$$V3 = 0.65 \times (Vh1 + Vh2 + VSC) \; cc \text{ and}$$

L is a predetermined coefficient.

2. A refrigeration apparatus according to claim 1, wherein said predetermined coefficient L satisfies the following relationship:

$$0.8 \leq L \leq 1.2.$$

3. A refrigeration apparatus according to claim 2, wherein said VR satisfies the following relationship:

$$100 \; cc \leq VR \leq 200 \; cc.$$

4. A refrigeration apparatus according to claim 1, further comprising:

a sight glass for observing a state of said refrigerant that flows from said supercooler.

5. A refrigeration apparatus according to claim 4, wherein:

said condenser and said receiver form an integrated condenser-receiver disposed between said compressor and said sight glass;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

6. A refrigeration apparatus according to claim 4, wherein:

said condenser and said receiver form an integrated condenser-receiver disposed between said compressor and said sight glass;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

7. A refrigeration apparatus according to claim 1, wherein said VR satisfies the following relationship:

$$100 \; cc \leq VR \leq 200 \; cc.$$

8. A refrigeration cycle according to claim 7, wherein:

said condenser and said receiver form an integrated condenser-receiver disposed between said compressor and said thermostatic expansion valve;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

9. A refrigeration apparatus according to claim 7, wherein:

said condenser and said receiver form an integrated condenser-receiver disposed between said compressor and said thermostatic expansion valve;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

10. A refrigeration apparatus according to claim 1, wherein:

said condenser and said receiver form an integrated condenser-receiver disposed between said compressor and said thermostatic expansion valve;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

11. A refrigeration apparatus according to claim 1, wherein:

said condenser and said receiver form an integrated condenser-receiver disposed between said compressor and said thermostatic expansion valve;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

12. A refrigeration apparatus comprising:

a compressor for compressing refrigerant;

a condenser of volume capacity VCOND1, said condenser having a plurality of condensing tube members for condensing said refrigerant that flows therein from said compressor and a converging member of volume capacity Vh1 for converging said refrigerant that flows therein from said plurality of condensing tube members;

a receiver of required volume capacity VR for separating said refrigerant from said converging member of said condenser into gaseous refrigerant and liquid refrigerant and discharging said liquid refrigerant;

a supercooler of volume capacity VCOND2, said supercooler having a distributing member of volume capacity Vh2 for distributing said refrigerant that flows therein from said receiver and a supercooling tube member of volume capacity VSC for supercooling said refrigerant distributed by said refrigerant distributing member;

a first thermostatic expansion valve for expanding said refrigerant that flows therein;

a second thermostatic expansion valve connected in parallel with said first thermostatic expansion valve for expanding said refrigerant that flows therein;

a first refrigerant evaporator of volume capacity VFEVA for evaporating said refrigerant that flows therein from said first thermostatic expansion valve;

a second refrigerant evaporator of volume capacity VREVA connected in parallel with said first refrigerant evaporator for evaporating said refrigerant that flows therein from said second thermostatic expansion valve;

a refrigerant pipe coupled to said second thermostatic expansion valve; and a switching valve provided in said refrigerant pipe for opening and closing said refrigerant pipe, wherein VR satisfies the following relationship:

$$VR = L \times (V1 + V2 - V3 + V4) \text{ cc},$$

in which $$V1 = 1.52 \times 10^{-3} \times (VCOND1 + VCOND2) + 34.3 \times 10^{-3} \times VFEVA \text{ cc},$$

$$V2 = 170 \text{ cc},$$

$$V3 = 0.65 \times (Vh1 + Vh2 + VSC) \text{ cc},$$

$$V4 = VP + 6.5 \times 10^{-2} \times VREVA \text{ cc},$$

L is a predetermined coefficient and

VP is a capacity volume of said refrigerant pipe from said switching valve to said second thermostatic expansion valve.

13. A refrigeration apparatus according to claim 12, wherein said predetermined coefficient L satisfies the following relationship:

$$0.8 \leq L \leq 1.2.$$

14. A refrigeration apparatus according to claim 13, wherein said VR satisfies the following relationship:

$$120 \text{ cc} \leq VR \leq 350 \text{ cc}.$$

15. A refrigeration apparatus according to claim 12, further comprising:

a sight glass for observing a state of said refrigerant that flows from said supercooler.

16. A refrigeration apparatus according to claim 15, wherein:

said condenser and said receiver form an integrated condenser-receiver disposed between said compressor and said sight glass;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

17. A refrigeration apparatus according to claim 15, wherein:

said condenser and said receiver form an integrated condenser-receiver disposed between said compressor and said sight glass;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

18. A refrigeration apparatus according to claim 12, wherein said VR is set such that $$120 \ cc \leq VR \leq 350 \ cc.$$

19. A refrigeration apparatus according to claim 18, wherein:

said condenser and said receiver form an integrated condenser-receiver disposed between said compressor and said first thermostatic expansion valve;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

20. A refrigeration apparatus according to claim 18, wherein:

said condenser and said receiver form an integrated condenser-receiver disposed between said compressor and said first thermostatic expansion valve;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

21. A refrigeration apparatus according to claim 12, wherein:

said condenser and said receiver form an integrated condenser-receiver disposed between said compressor and said first thermostatic expansion valve;

said integrated condenser-receiver includes a core, a header, and a receiver unit;

said core includes said condensing tube members of said condenser and said supercooling tube member of said supercooler;

said header includes said converging member of said condenser and said distributing member of said supercooler, said header disposed between said condensing tube members and said supercooling tube member; and said receiver unit includes said receiver, said receiver having a first communicating member which communicates with said converging member of said condenser and a second communicating member which communicates with said distributing member of said supercooler.

22. A refrigeration apparatus according to claim 12, wherein:

said condenser and said receiver form an integrated condenser-receiver disposed between said compressor and said first thermostatic expansion valve;

said integrated condenser-receiver includes a core, a header, and a receiver unit;

said core includes said condensing tube members of said condenser and said supercooling tube member of said supercooler; and said header includes said converging member of said condenser, said distributing member of said supercooler, a gas-liquid separating member for separating said refrigerant into gaseous refrigerant and liquid refrigerant, a first communicable member which is communicable with said converging member and said gas-liquid separating member and a second communicable member which is communicable with said gas-liquid separating member and said distributing member.

* * * * *

UNITED STATES PATENT AND TRADEMARK OFFICE
CERTIFICATE OF CORRECTION

PATENT NO. : 5,813,249
DATED : September 29, 1998
INVENTOR(S) : Hiroki Matsuo et al It is certified that error appears in the above-identified patent and that said Letters Patent is hereby corrected as shown below:

Col. 1, line 56, delete "receivers," and substitute --receiver-- therefor

Col. 2, line 17, after "problems" insert --with--

Col. 4, line 67, after "as" insert --a--

Col. 6, line 25, after "corrosion-resistant" insert --metal--

Col. 6, line 48, "of-the" should be --of the--

Col. 7, line 53, delete "the"

Col. 8, line 2, delete "blazing" and substitute --brazing-- therefor

Col. 8, line 31, delete "blazing" and substitute --brazing-- therefor

Col. 12, line 32, delete "converge" and substitute --converges-- therefor

Col. 18, line 25, claim 8, "cycle" should be --apparatus--

Signed and Sealed this

Twenty-third Day of March, 1999

Attest:

Q. TODD DICKINSON

*Attesting Officer*     *Acting Commissioner of Patents and Trademarks*